United States Patent
Deutsch et al.

(10) Patent No.: US 6,293,078 B1
(45) Date of Patent: Sep. 25, 2001

(54) NARROW ROW CROP HARVESTER WITH LATERAL CONVEYING OF CUT ROW

(75) Inventors: Timothy Arthur Deutsch; Howard C. Hadley, both of Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/436,330

(22) Filed: Nov. 8, 1999

(51) Int. Cl.$^7$ .................................................. A01D 46/16
(52) U.S. Cl. ......................................... 56/44; 56/41
(58) Field of Search .............................. 56/33, 34, 37, 56/39, 127, 330, 41, 44, 43, 47, 50, 48

(56) References Cited

U.S. PATENT DOCUMENTS

| | | | |
|---|---|---|---|
| 2,986,861 | * 6/1961 | Hubbard | 56/41 |
| 3,031,828 | * 5/1962 | Graham | 56/11.9 |
| 3,035,387 | 5/1962 | Bevill | 56/28 |
| 3,088,262 | * 5/1963 | Graham | 56/41 |
| 3,176,451 | * 4/1965 | Hubbard | 56/13.2 |
| 3,352,092 | * 11/1967 | Hubbard | 56/13.2 |
| 3,645,075 | 2/1972 | Kappelman et al. | 56/28 |
| 3,685,263 | 8/1972 | Kappelman et al. | 56/1 |
| 4,249,365 | * 2/1981 | Hubbard et al. | 56/13.2 |
| 4,269,017 | 5/1981 | deBuhr et al. | 56/106 |
| 4,470,245 | 9/1984 | Agadi | 56/28 |
| 4,501,112 | * 2/1985 | Thedford et al. | 56/13.3 |
| 4,538,403 | * 9/1985 | Fachini | 56/44 |
| 4,821,497 | 4/1989 | Deutsch et al. | 56/41 |
| 5,247,786 | * 9/1993 | Schreiner | 56/41 |
| 5,412,930 | * 5/1995 | Sheldon, Jr. | 56/44 |
| 5,471,826 | * 12/1995 | Schreiner | 56/41 |
| 5,519,988 | * 5/1996 | Copley et al. | 56/30 |
| 5,557,910 | * 9/1996 | Del Rosario | 56/30 |

* cited by examiner

Primary Examiner—Thomas B. Will
Assistant Examiner—Arpad Fabian Kovacs (57) ABSTRACT

A narrow row harvesting unit for harvesting a crop planted in closely spaced rows. In a cotton picker, the crop removing portion of the unit includes a tandem drum arrangement. The unit includes first and second row receiving areas spaced on the order of twelve inches (30 cm) apart and separated by a narrow stalk lifter. The crop removing portion of the row unit provides transverse movement of a first row of the crop towards a second row of the crop behind the stalk lifter. In the cotton picker unit, a forward upright drum includes spindles projecting through a grid bar arrangement intercepting the first row of crop to move the plants laterally along grid bars into the main crop removing zone which is aligned with the second row. A cutter offset just ahead of the forward drum severs the plants in the first row, and a rotating column with plant engaging projections cooperates with the drum to direct the severed plants into the standing second row.

29 Claims, 4 Drawing Sheets

NARROW ROW CROP HARVESTER WITH LATERAL CONVEYING OF CUT ROW

BACKGROUND OF THE INVENTION

1) Field of the Invention

The present invention relates generally to agricultural harvesters, and, more specifically, to a harvester for removing crop from adjacent, closely spaced rows of plants.

2) Related Art

Harvesters such as cotton pickers include row units having upright picker drums with spindles projecting into a row receiving area to remove cotton from a row of plants. Harvesting very narrowly spaced rows of cotton has been a continuing source of difficulty. Cotton picker units such as shown in commonly assigned U.S. Pat. No. 4,821,497 with picker drums supported in tandem on one side only of the row, or nested row harvesting units as shown in U.S. Pat. No. 4,538,403 have provided row harvesting capability for some narrow row spacings, but the reduction has not been sufficient to accommodate very narrowly spaced rows of fifteen inches or less. In some areas the rows may be spaced as closely as twelve inches (30 cm), and harvesting with conventional row units can result in substantial adjacent row plant damage and cotton loss.

In copending and commonly assigned U.S. application Ser. No. 09/322,453 entitled NARROW ROW COTTON HARVESTER and filed May 28, 1999, now U.S Pat. No. 6,212,864, a crop severing and conveying attachment is described for cutting a row of plants and moving the plants into an adjacent standing row prior to contact by a forward spindle drum. The cut plants intertwine with the standing row so the picking drums can remove cotton from both rows of plants. Although the attachment is capable of harvesting rows spaced apart fifteen inches or less, the cutter as shown therein is offset forwardly from the drums a considerable distance. The plants must be supported well to keep them upright as they move diagonally rearwardly into the adjacent standing row, and the system requires a relatively long belt conveyer and cutter drive system. The front of the attachment extends forwardly beyond the row unit thereby substantially increasing the operating length of the harvester.

BRIEF SUMMARY OF THE INVENTION

It is therefore an object of the present invention to provide an improved harvester row unit for harvesting crops planted in narrowly spaced rows. It is a further object to provide such a unit which overcomes most or all of the aforementioned problems.

It is a further object to provide such an improved harvester row unit for harvesting narrowly spaced rows of plants which is simple in construction and which does not substantially increase the harvester length or weight over that of a harvester having a conventional row unit with single row capacity. It is a further object to provide such a harvester which obviates relatively long conveyors and drives and forwardly mounted cutting devices.

It is another object to provide an improved harvester row unit capable of harvesting rows of cotton space twelve inches (30 cm) or less. It is another object to provide such unit having a tandem spindle drum harvesting arrangement and two built-in and closely spaced row receiving areas for accommodating two adjacent rows of cotton.

It is yet a further object of the invention to provide an improved cotton harvester row unit for simultaneously harvesting two closely spaced rows of cotton wherein a forward drum provides both a transport function for one of the rows and a cotton removing function for both of the rows. It is still a further object to provide such a unit including a crop severing device located adjacent the forward drum behind the forwardmost extremity of the unit. It is another object to provide an improved grid bar arrangement for such a unit which helps to guide the transported row into the harvesting zone A narrow row harvesting unit is described for harvesting a crop planted in closely spaced rows. In the embodiment shown for a cotton picker, the crop removing portion of the unit includes a tandem drum arrangement. The unit includes first and second row receiving areas spaced on the order of one foot (30 cm) apart and separated by a narrow stalk lifter.

The crop removing portion of the row unit provides transverse movement of a first row of the crop towards a second row of the crop behind the stalk lifter. In the cotton picker unit, a forward upright drum includes spindles projecting through a grid bar arrangement intercepting the first row of crop. The plants are moved laterally along grid bars into the main crop removing zone which is aligned with the second row. A cutter offset just ahead of the forward drum severs the plants in the first row, and a rotating column with plant engaging projections cooperates with the drum to direct the severed plants into the standing second row.

The unit is simple and inexpensive in construction and light in weight. Crop row severing occurs close to the forward spindle drum to avoid long drive and conveyor belt runs. The length of the unit is not increased over that of a unit which harvests only a single row of crop. Since the forward drum acts not only to remove cotton from both rows of plants but also cooperates with the grid bar arrangement and rotating column to aggressively move a severed row of plants in an upright position towards the standing row, conveyor and drive complexity and cost are reduced. The cutter and rotating column can be mounted for rotation about a common axis to further simplify drive. The drum, grid bars and rotating column provide good support and transverse movement of the severed row of plants with little or no crop damage, even when the rows are spaced more widely than twelve inches (30 cm). Utilizing the forward drum for moving the severed plants also helps to pull the plants along the rearwardly extending portion of the grid bars and into the standing row for efficient boll removal by the spindles. A conventional row unit with single row capacity can be easily and inexpensively modified for two row capacity.

These and other objects, features and advantages of the present invention will become apparent to one skilled in the art upon reading the following detailed description in view of the drawings.

DETAILED DESCRIPTION OF THE DRAWINGS

Figure 1:
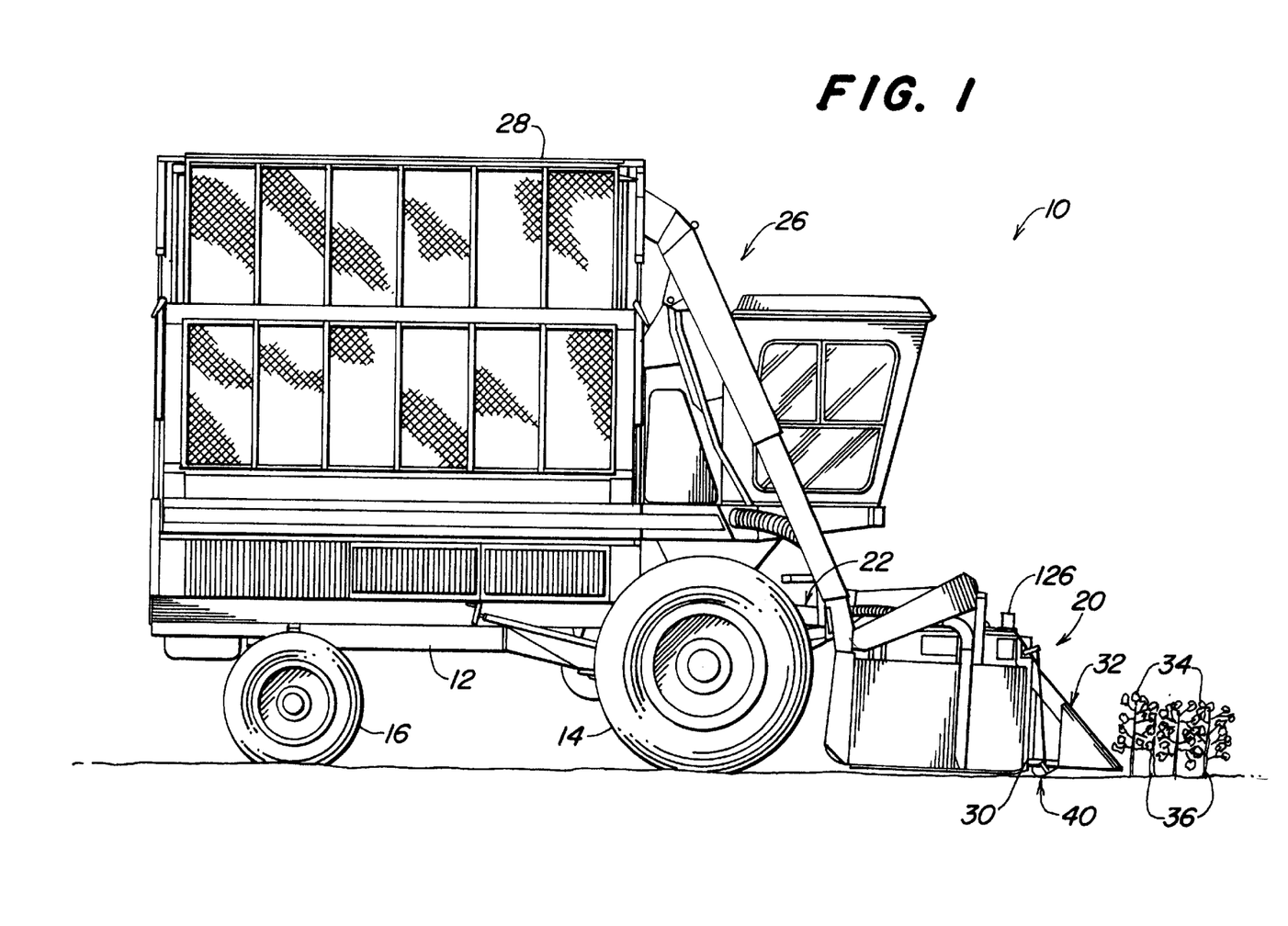
FIG. 1 is a side view of a cotton harvester with row units attached thereto.

Referring now to FIG. 1, therein is shown a cotton harvester 10 including a main frame 12 supported for forward movement over a field of plants to be harvested by forward drive wheels 14 and rear steerable wheels 16. Transversely spaced multiple row harvesting units 20 are supported from the forward end of the frame 12 by one or more conventional hydraulically controlled lift structures 22. The row units 20 remove cotton from rows of the plants, and an air duct system 26 directs the removed cotton rearwardly and upwardly into a basket 28. Although the row units 20 are shown mounted on a self-propelled harvester, is to be understood that they can also be attached to a tractor in a conventional tractor mounted configuration.

The row unit 20 includes a forward frame assembly 30 supporting stalk lifter structure 32 which helps to guide closely spaced, adjacent rows of plants into the unit. A height sensing shoe assembly 40 is supported from the frame assembly 30 and controls the lift control structure 22 to maintain the unit 20 at a generally constant height above the ground during field operations as ground and surface conditions vary.

Figure 4:
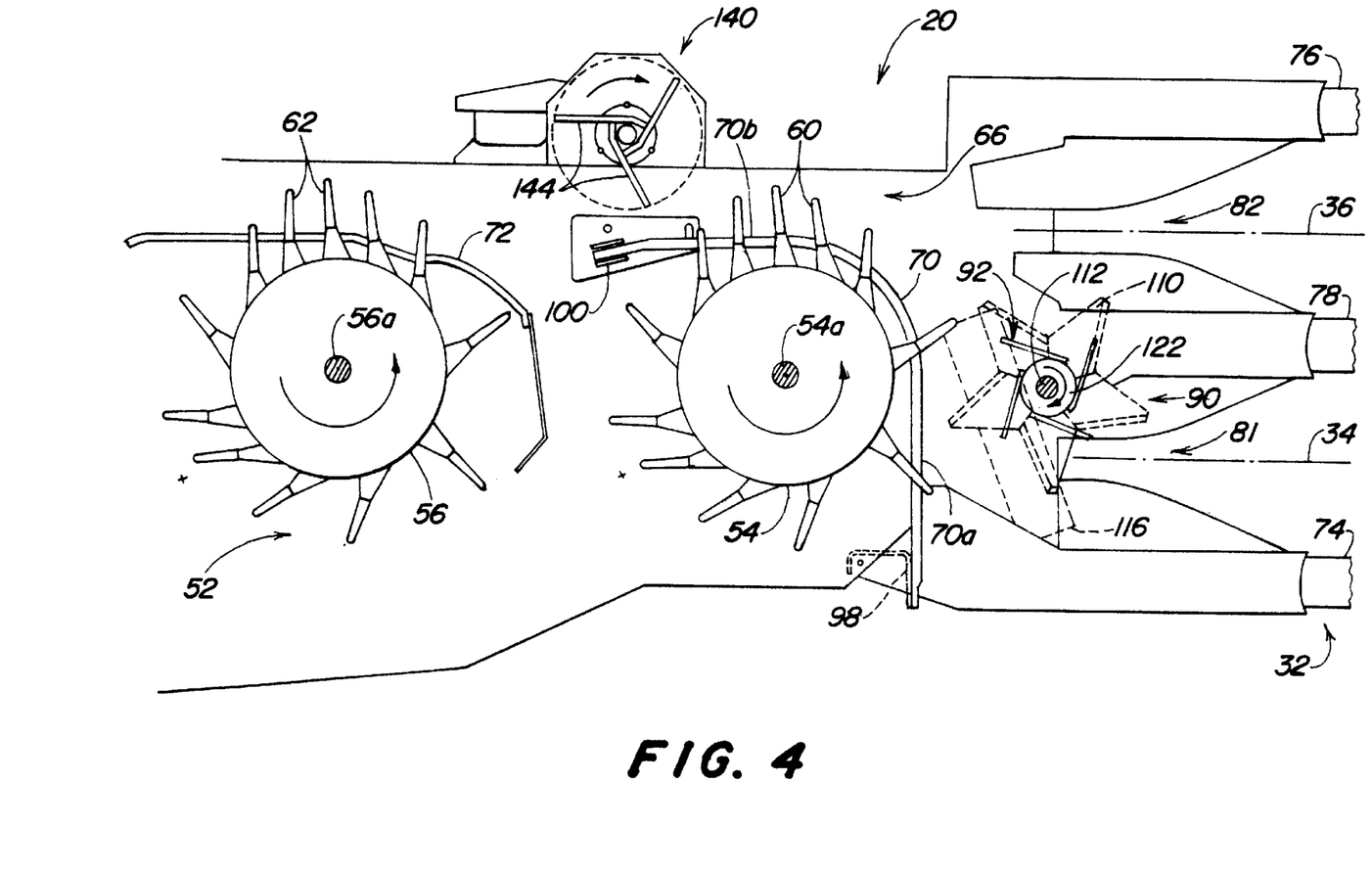
FIG. 4 is a top view of a portion of the row unit of FIG. 2 showing the row receiving areas and crop removing zone adjacent the tandem drums.

The row unit 20 includes a framed row unit housing 50 supporting a tandem drum arrangement 52 (FIG. 4) generally of the type shown and described in the aforementioned U.S. Pat. No. 4,821,497. The arrangement 52 includes forward and rearward spindle drums 54 and 56 supported for rotation (in the counterclockwise direction as shown in FIG. 4) about upright axes 54a and 56a which are generally aligned in the fore and aft direction. Spindles 60 and 62 which are rotated about their axes project into a cotton removal or harvest zone 66 through grid bars 70 and 72 to remove cotton from the cotton plants passing rearwardly through the zone. The cotton is then doffed from the spindles by conventional upright doffer columns (not shown) and moved rearwardly for delivery to the basket 28 by the air system 26.

Figure 2:
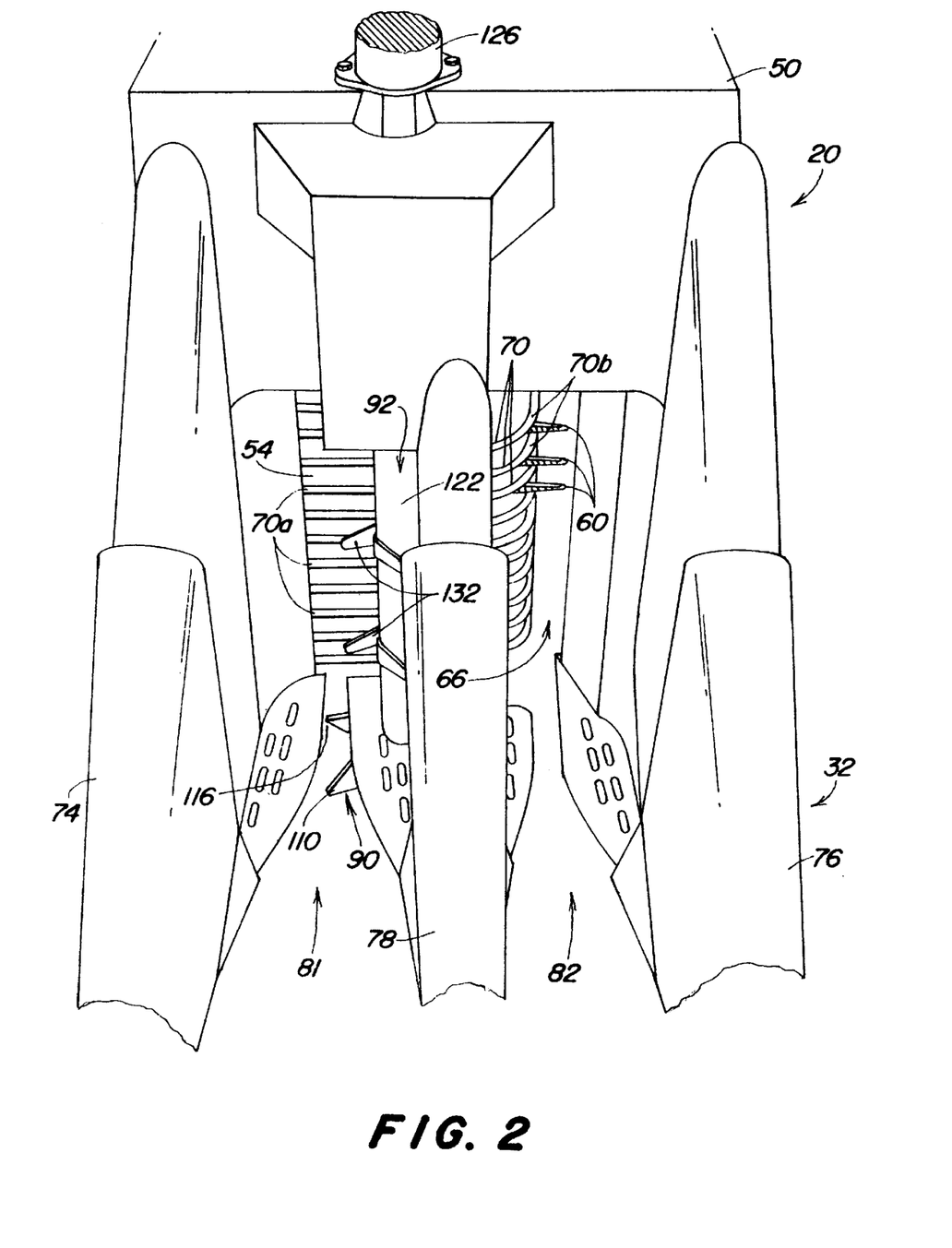
FIG. 2 is an enlarged front perspective view of a portion of the row unit on the harvester of FIG. 1
Figure 3:
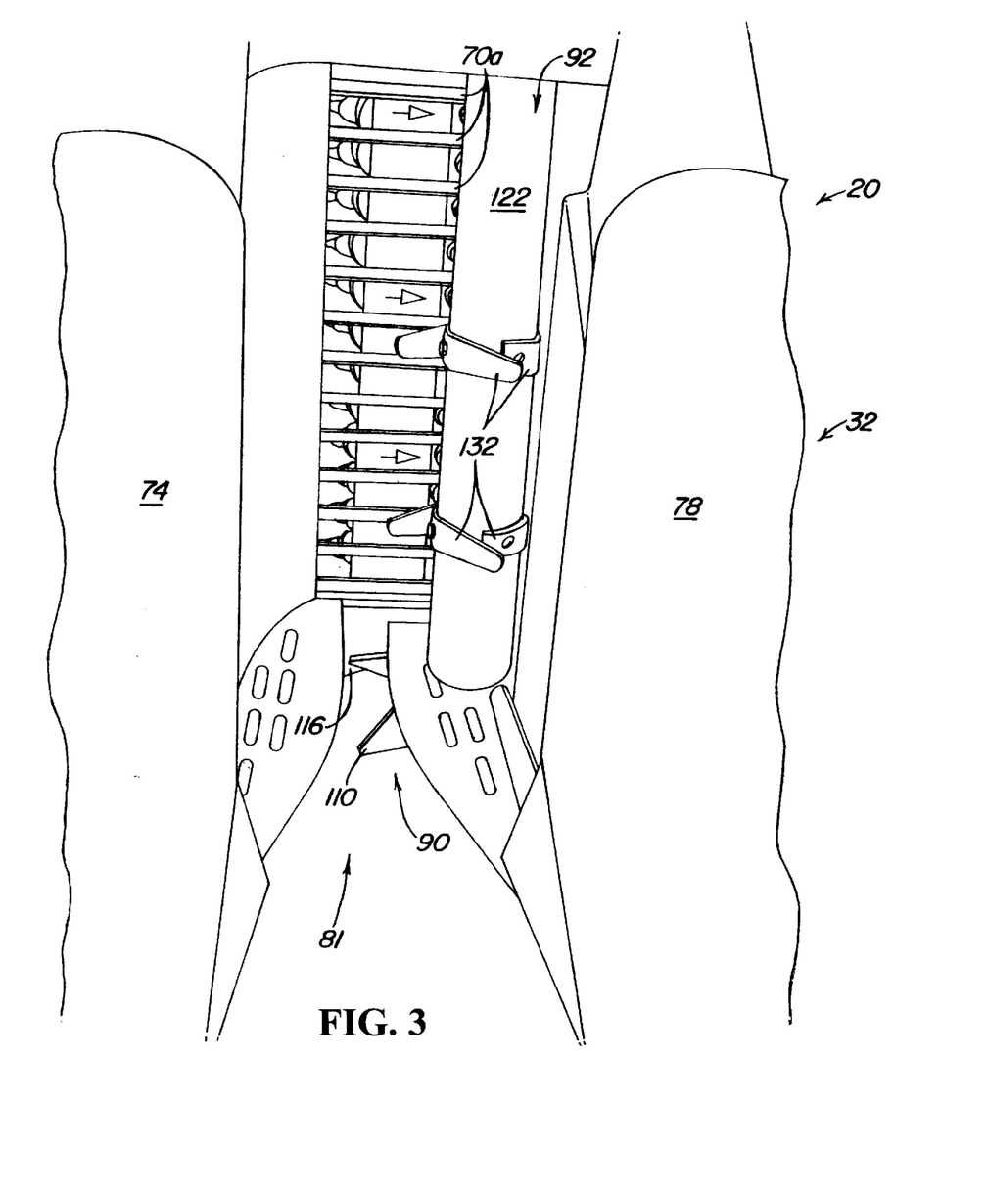
FIG. 3 is an enlarged front perspective view of the first row receiving area of the row unit of FIG. 2.

As shown in FIGS. 2–4, the stalk lifter structure 32 on the row unit 20 includes narrow outer lifters 74 and 76 and a narrow central lifter 78 positioned between the lifters 74 and 76. First and second closely spaced, fore and aft extending row receiving areas 81 and 82 are defined between lifter pairs 74,78 and 76,78 respectively, for receiving the adjacent rows 34 and 36 of cotton plants spaced on the order of twelve inches apart. The row receiving area 82 as shown in FIGS. 2 and 4 is aligned with the harvest zone 66 so that the row 36 enters directly into the zone for removal of the cotton from the plants by the spindles 60 and 62. The row 34 enters the first row receiving area 81 which is aligned with the tandem drum arrangement 52 and a forward portion of the grid bar structure.

To accommodate the first row 34 which is closely spaced to the row 36 but offset laterally from the zone 66, a rotating cutter assembly 90 is supported in the row receiving area 81 near the lower extremity of the housing 50 slightly forwardly of the spindle drum 54 to sever the first row of plants just above the ground. An upright plant contacting member 92 rotatable in the clockwise direction (FIG. 4) cooperates with counterclockwise rotating drum 54 to aggressively move the severed plants laterally in an upright position along the grid bars 70 into the standing row 36 and then rearwardly with the standing row into the harvest zone 66.

The grid bars 70 are horizontal and include a forward laterally extending section 70a connected at an end to an upright support member 98. The bars 70 are spaced vertically and extend laterally to a bend location at the harvest zone 66 where the curve rearwardly to portions 70b. The aft ends of the bars 70 are connected to a rear upright support member 100. The spindles 60 traverse a path in which they begin to extend through the grid bars 70 adjacent the row receiving area 81 (FIG. 4) to contact the plants severed from the row 34. The severed plants are moved along the front of the grid bar portions 70a by the lateral movement of the spindles 60, aided by the counter-rotating member 92 which helps to move and hold the severed plants in an upright position as the approach the standing row of plants. The spindles 60 also help to urge the severed plants rearwardly around the curved portion of the grid bars 70 as the plants intertwine with the standing row.

As shown, the rotating cutter assembly 90 includes a star-shaped cutter wheel 110 rotatable by a shaft 112 about an upright axis parallel to and generally aligned with the axes 54a and 56a of the drums 54 and 56 (FIG. 4). A cutter plate 116 extending across the row receiving area and supported from the lifter frame just below the cutter wheel 110 cooperates with the wheel to efficiently sever the lower portion of the plants. The wheel 110 also helps to maintain the rearward motion of the lower portion of the plants over the plate 116 as the member 92 and the forward drum 54 engage the plants to move them laterally into the zone 66.

The upright plant contacting member 92 includes a cylindrical portion 122 extending vertically from the cutter assembly 90 forwardly adjacent the drum 54. Preferably, the cylindrical portion 122 and the cutter wheel 110 are both connected for rotation with the shaft 112 for rotation about a common axis to simplify drive. A hydraulic motor 126 or other suitable drive, such as a gear arrangement driven directly from the row unit drive, is supported by the housing 50 and rotates the cutter wheel 110 and the cylindrical portion 122 about the axis of the shaft 112 to provide plant cutting and conveying functions. Paddles or extensions 132 are connected to the periphery of the cylindrical portion 122 at vertically offset locations to engage the severed plants and aid in moving the plants in an upright position against the grid bars 70 towards the zone 66. The moving spindles 60 projecting through the grid sections 70a and the rotating cylindrical portion 122 and extensions 132 aggressively move the severed plants laterally in an upright position without damaging the cotton.

To aid movement of the severed plants rearwardly with the standing row of plants and prevent blockages that might otherwise occur because the plants are severed, an upright kicker finger column 140 is supported for rotation in the zone 66 adjacent the rear portions of the grid bars 70. The column 140 includes fingers 144 extending radially towards the bars 70 to help propel plants and debris rearwardly.

Having described the preferred embodiment, it will become apparent that various modifications can be made without departing from the scope of the invention as defined in the accompanying claims.

We claim:

1. A cotton harvester row unit having a unit frame and adapted for forward movement over a field of closely spaced rows of cotton plants for harvesting cotton from rows of the plants, the row unit comprising:

a first row receiving area for receiving a first row of the adjacent rows of cotton generally along a path parallel to the forward direction;

drum structure including an upright spindle drum located in the path and rotatable about an upright axis;

a row harvesting zone offset laterally from the first row receiving area;

wherein the row unit includes a second row receiving area adjacent the first row receiving area for receiving a second row of plants adjacent the first row as the first row is received;

wherein the upright spindle drum includes spindles moving laterally through the path towards the harvesting zone, the drum structure facilitate movement of the of the plants laterally to the harvesting zone;

wherein the second row receiving area is generally aligned with the harvesting zone and the spindles move the plants from the first row into the second row and removed cotton from the plants in the harvesting zone from the first and second rows.

2. The row harvesting unit as set forth in claim 1 including grid structure supported between the first row receiving area and the spindle drum, the grid structure extending laterally towards the row harvesting zone and guiding the first row into the harvesting zone.

3. The row harvesting unit as set forth in claim 1 including blade structure projecting into the path for severing the first row of cotton plants thereby facilitating movement of the plants towards the harvesting zone.

4. The row harvesting unit as set forth in claim 1 including upright rotatable plant contacting structure located forwardly of the spindle drum, the spindles cooperating with the plant contacting structure for moving the plants towards the harvesting zone.

5. The row harvesting unit as set forth in claim 4 including a blade structure located at a lower end of the plant contacting structure and rotatable therewith about a common rotational axis for severing the first row of cotton plants.

6. The row harvesting unit as set forth in claim 5 wherein the plant contacting structure and the spindle drum are rotatable about parallel upright axes spaced in the fore and aft direction from each other, and wherein the spindles traverse a spindle path located close to but offset slightly rearwardly of the plant contacting structure, the severed cotton plants passing between the plant contacting structure and the spindle drum.

7. The row harvesting unit as set forth in claim 1 including a rear spindle drum located rearwardly of the first-mentioned spindle drum and in the path, the first and second spindle drums located on one side only of the harvesting zone and removing cotton from the severed row of cotton plants in the harvesting zone.

8. A cotton harvester row unit having a unit frame and adapted for forward movement over a field of closely spaced rows of cotton plants for harvesting cotton from at least one of the rows of the plants, the row unit comprising:

a first row receiving area for receiving a first row of the adjacent rows of cotton generally along a path parallel to the forward direction;

drum structure including an upright spindle drum located in the path and rotatable about an upright axis;

a row harvesting zone offset laterally from the first row receiving area;

wherein the upright spindle drum includes spindles extending into the path and movable towards the harvesting zone, the drum structure facilitating movement of the plants laterally to the harvesting zone;

wherein the row unit includes a second row receiving area adjacent the first row receiving area for receiving a second row of plants adjacent the first row; and wherein the second row receiving area is generally aligned with the harvesting zone and the spindles move the plants from the first row towards the second row, the spindles also removing cotton from the plants from the first and second rows in the harvesting zone.

9. A cotton harvester row unit having a unit frame and adapted for forward movement over a field of closely spaced rows of cotton plants for harvesting cotton from at least one of the rows of the plants, the row unit comprising:

a first row receiving area for receiving a first row of the adjacent rows of cotton generally along a path parallel to the forward direction;

drum structure including an upright spindle drum located in the path and rotatable about an upright axis;

a row harvesting zone offset laterally from the first row receiving area;

wherein the upright spindle drum includes spindles extending into the path and movable towards the harvesting zone, the drum structure facilitating movement of the plants laterally to the harvesting zone;

a rear spindle drum located rearwardly of the first-mentioned spindle drum and in the path, the first and second spindle drums located on one side only of the harvesting zone and removing cotton from the severed row of cotton plants in the harvesting zone; and a second row receiving area adjacent the first row receiving area and receiving a second row of plants adjacent the first row, the spindles of the first drum moving the first row of plants into the second row so the spindle drums remove cotton from first and second rows of plants in the harvesting zone.

10. A harvester row unit adapted for movement in a forward direction through a field for removing crop from closely spaced row of plants, the row unit including:

a first row receiving area for receiving a first row of plants;

a second row receiving area for receiving a second row of plants;

crop removing structure including an upright harvesting drum for removing the crop from the first and second rows of plants, the crop removing structure including movable crop engaging members having a substantial movement transverse to the forward direction and traversing a path which intercepts the first row of plants, the crop engaging members extending into a fore and aft extending harvesting zone; and wherein the second row receiving area is generally aligned with the harvesting zone, and the crop engaging members move the plants from the first row into the harvesting zone and remove crop from the first and second rows in the harvesting zone.

11. The row unit as set forth in claim 10 further including severing structure engaging the first row of plants forwardly adjacent the upright drum.

12. The row unit as set forth in claim 11 wherein the severing structure includes a blade rotatable about a blade axis forwardly of the drum axis, and further comprising a plant contacting member rotatable in contact with the first row of plants about an upright axis forwardly of the drum axis.

13. The row unit as set forth in claim 12 wherein the upright axis corresponds to the blade axis.

14. The row unit as set forth in claim 10 further comprising grid structure extending generally transversely from a location aligned with the first row receiving area and including a rearwardly directed portion adjacent the second row, the crop engaging members comprising spindles projecting through the grid structure into plant contacting relationship with the first row.

15. The row unit as set forth in claim 12 wherein the severing structure is rotatable about a blade axis which is generally parallel to and aligned in the fore and aft direction with drum axis.

16. The row unit as set forth in claim 15 wherein the blade axis is located between the first and second row receiving areas.

17. A cotton harvester row unit having a unit frame and adapted for forward movement over a field of closely spaced rows of cotton plants for harvesting cotton from at least one of the rows of the plants, the row unit comprising:
   a fore and aft extending first row receiving area for receiving a first row of the adjacent rows of cotton generally along a path parallel to the forward direction;
   drum structure including an upright spindle drum located in the path and rotatable about an upright axis;
   a crop removing zone offset laterally from the first row receiving area and aligned with a second row of plants;
   wherein the upright spindle drum includes spindles projecting into the path and movable towards the crop removing zone and into the zone for removing cotton from the second row of plants, the drum structure facilitating movement of the first row of plants laterally towards the second row and into the crop removing zone; and
   wherein the first row receiving area is aligned with the drum structure, and wherein the drum structure includes a forward drum intercepting the first row, and further including upright conveying structure forwardly adjacent the drum structure and cooperating with the forward drum to move the first row transversely towards the second row.

18. The row unit as set forth in claim 17 wherein the upright axis of the spindle drum lies generally in the path of the first row, and further including a rotating plant contacting member rotatable about an axis parallel to and offset forwardly of the upright axis of the spindle drum, wherein the projecting spindles and the plant contacting member cooperate to move the first row of plants laterally therebetween.

19. A cotton harvester row unit having a unit frame and adapted for forward movement over a field of closely spaced rows of cotton plants for harvesting cotton from at least one of the rows of the plants, the row unit comprising:
   a fore and aft extending row receiving area for receiving a first row of the adjacent rows of cotton generally along a path parallel to the forward direction;
   drum structure including an upright spindle drum located in the path and rotatable about an upright axis;
   a crop removing zone offset laterally from the first row receiving area;
   wherein the upright spindle drum includes spindles projecting into the path and movable towards the crop removing zone, the drum structure facilitating movement of the plants laterally to the crop removing zone; and
   including a second row receiving area offset laterally from the fore and aft extending row receiving area for receiving a second row of cotton plants next adjacent the first row, wherein the second row receiving area is generally aligned with the row harvesting zone so that the crop on both the first and second rows of plants is removed in the crop receiving zone.

20. The row unit as set forth in claim 19 including a fore and aft extending stalk lifter connected to the unit frame and supported between the first and second row receiving areas, and wherein the spindle drum moves plants from the second row receiving area behind the stalk lifter to the crop removing zone.

21. The row unit as set forth in claim 19 wherein the drum structure comprises tandem drum structure having a rearward spindle drum located rearwardly of the upright spindle drum and adjacent the second row receiving area, the tandem drum structure including spindles projecting into the crop receiving zone from one side only of the zone.

22. The row unit as set forth in claim 19 wherein the drum structure includes grid structure extending laterally from a location generally aligned with the first row receiving area in the path of the first row of plants, the grid structure extending rearwardly adjacent the forward drum along one side of the crop receiving zone and guiding the first row of plants towards the crop receiving zone.

23. The row unit as set forth in claim 22 further including a cutting device located forwardly adjacent the grid structure in the path of the first row of plants for severing the first row of plants.

24. A cotton harvester row unit having a unit frame and adapted for forward movement over a field of cotton plants in parallel rows closely spaced a preselected distance apart for harvesting cotton from two adjacent rows of plants, the row unit comprising:
   a first fore and aft extending row receiving area for receiving a first row of the adjacent rows of cotton;
   a second fore and aft extending row receiving area for receiving a second row of the adjacent rows of cotton;
   tandem drum structure supported by the unit frame and located adjacent the second second row receiving area, the tandem drum structure including spindles projecting into the second second row receiving area from one side only of the second row receiving area and defining a cotton removal zone; and
   a fore and aft extending stalk lifter having a width substantially less than the preselected distance and supported from the unit frame between the first and second row receiving areas, the stalk lifter guiding the first and second rows relative to the first and second row receiving areas; and
   wherein the first row receiving area is aligned with the tandem drum structure, and wherein the tandem drum structure includes a forward drum intercepting the first row, and further including upright conveying structure forwardly adjacent the tandem drum structure and cooperating with the forward drum to move the first row into the cotton removal zone with the second row so that the spindles project into the moved first row and the second row in the cotton removal zone.

25. The row unit as set forth in claim 24 including a grid bar having a transversely extending portion extending from the first row toward the second row, the forward drum including spindles moving the first row transversely and rearwardly, along the grid bar into the second row.

26. The row unit as set forth in claim 24 including a rotational member supported adjacent the tandem drum structure for propelling plant debris rearwardly.

27. A cotton harvester row unit having a unit frame and adapted for forward movement over a field of cotton plants in parallel rows for harvesting cotton from two adjacent rows of the plants spaced as closely as twelve inches (30 cm), the row unit comprising:
   a first fore and aft extending row receiving area for receiving a first row of the adjacent rows of cotton;
   a second fore and aft extending row receiving area for receiving a second row of the adjacent rows of cotton;
   tandem drum structure supported by the unit frame and located adjacent the second row receiving area, the tandem drum structure including spindles projecting into the second row receiving area from one side only of the second row receiving area and defining a cotton removal zone;

a fore and aft extending stalk lifter having a width substantially less than twelve inches (30 cm) supported from the unit frame between the first and second row receiving areas, the stalk lifter guiding the first and second rows relative to the first and second row receiving areas; and wherein the first row receiving area is aligned with the tandem drum structure, and wherein the tandem drum structure includes a forward drum intercepting the first row, and further including upright conveying structure forwardly adjacent the tandem drum structure and cooperating with the forward drum to move the first row transversely towards the second row.

28. The row unit as set forth in claim 27 wherein the upright conveying structure comprises a plant contacting member rotating about an upright conveyor axis, and further including a cutter located below the conveyor substantially rearwardly of the stalk lifter.

29. The row unit as set forth in claim 28 wherein the cutter and the plant contacting member have a common rotational axis located closely adjacent the forward drum.

\* \* \* \* \*

UNITED STATES PATENT AND TRADEMARK OFFICE
CERTIFICATE OF CORRECTION

PATENT NO. : 6,293,078 B1
DATED : September 25, 2001
INVENTOR(S) : Timothy Arthur Deutsch et al.

It is certified that error appears in the above-identified patent and that said Letters Patent is hereby corrected as shown below:

Column 5,
Line 3, delete "facilitate" and insert -- facilitating --.
Line 3, delete "of the" (1st occurrence).
Line 6, delete "move" and insert -- facilitate movement of --.

Column 7,
Line 40, after "extending" insert -- first --.

Column 8,
Line 26, delete "second" (2nd occurrence).
Line 28, delete "second" (2nd occurrence).
Line 30, delete "and".
Line 48, after "row" insert -- and a rearwardly extending portion extending alongside the second row --.

Signed and Sealed this

First Day of October, 2002

Attest:

Attesting Officer

JAMES E. ROGAN
Director of the United States Patent and Trademark Office